United States Patent [19]

Johnstone et al.

[11] Patent Number: 4,801,355
[45] Date of Patent: Jan. 31, 1989

[54] TABULAR ACICULAR GYPSUM AND METHOD OF FILLING PAPER

[75] Inventors: Norman E. Johnstone, Schaumburg; John C. Gaynor, Des Plaines; Robert W. Erickson, Lindenhurst, all of Ill.

[73] Assignee: United States Gypsum Company, Chicago, Ill.

[21] Appl. No.: 4,545

[22] Filed: Jan. 16, 1987

[51] Int. Cl.⁴ ............................................. D21H 3/78
[52] U.S. Cl. ................................................. 162/181.3
[58] Field of Search ..................... 162/181.3; 423/555; 106/306

[56] References Cited

U.S. PATENT DOCUMENTS

| | | |
|---|---|---|
| 105,594 | 7/1870 | Pemberton . |
| 848,916 | 4/1907 | Monin . |
| 1,751,429 | 3/1930 | Thomson . |
| 1,962,887 | 6/1934 | Ashley et al. ........................ 423/555 |
| 2,235,531 | 3/1941 | Plumstead ............................. 23/122 |
| 2,304,361 | 12/1942 | Hoskins ................................... 92/21 |
| 2,530,986 | 11/1950 | Moses ....................................... 92/3 |
| 3,594,123 | 7/1971 | Encke et al. ......................... 423/555 |
| 3,627,485 | 12/1971 | Hori et al. ........................... 423/555 |
| 3,822,340 | 2/1974 | Eberl et al. .......................... 423/555 |
| 3,961,105 | 3/1976 | Eberl .................................... 427/220 |
| 4,152,408 | 4/1979 | Winslow .............................. 423/555 |
| 4,270,954 | 6/1981 | Aignesburger ....................... 106/47 |
| 4,310,360 | 1/1982 | Kvant .................................. 106/306 |

FOREIGN PATENT DOCUMENTS 1526165 9/1978 United Kingdom .

Primary Examiner—Peter Chin
Attorney, Agent, or Firm—John M. Lorenzen; Robert H. Robinson

[57] ABSTRACT

A tabular variety of acicular gypsum crystal filler is prepared by hydrating calcium sulfate dihydrate particles in a seeded continuously stirred reactor at a low level of super-saturation to obtain crystals having an aspect ratio of about 100:10:1 and average length in the longest dimension of about 100–450 micrometers. For the manufacture of paper, the obtained tabular crystal slurry may be directly added to the paper pulp before web formation to obtain a filled paper having high filler retention.

11 Claims, 2 Drawing Sheets

TABULAR ACICULAR GYPSUM AND METHOD OF FILLING PAPER

FIELD OF THE INVENTION

This invention relates to the manufacture of paper, and is particularly directed to the preparation and use of a mineral filler that is composed of tabular acicular crystals for the manufacture of paper. These crystals are of a shape reminiscent of a "tongue depressor stick" shape.

BACKGROUND OF THE INVENTION

In the manufacture of many types of paper, mineral fillers are incorporated with the pulp to improve such properties as color, opacity and printability. The fillers also allow the use of lessened amounts of cellulosic fiber in the pulp. Typical levels of filler addition in acid sized papers range from about 5 to about 12% by weight; but more recent alkaline sized papers can approach filler levels of 20% or more, particularly if expensive retention aids are included. However, large proportions of the fillers added to the pulp normally pass through the paper-making screens and are not retained in the paper web.

There have been many attempts to use low cost calcium sulfate fillers in paper making as a partial replacement of the paper pulp. Most of those attempts have centered around the use of finely ground gypsum (calcium sulfate dihydrate) or anhydrite spheroidal particles.

These relatively round particulate fillers are not at all well retained in the paper web. The use of retention aids helps but at a significant cost penalty. Specially prepared very elongated crystalline fiber forms of calcium sulfate having very high aspect ratios greater than 50:1 or even greater than 100:1 have been proposed for use in paper. These are said to be well retained without the use of retention aids but their preparation methods make them very expensive. They may be prohibitively expensive for most coarse papers, liners and paper boards, and their use may be generally confined to only the most refined grades of fine papers.

DESCRIPTION OF THE PRIOR ART

U.S. Pat. No. 848,916 discloses the addition of a thin paste of finely ground natural gypsum and water as a filler in paper making. U.S. Pat. No. 105,591 discloses the addition of finely ground natural gypsum or sulfuric acid precipitate as paper filler, and improved retention in the paper by using a sulfate saturated water with the finely divided powder. U.S. Pat. No. 4,470,877 teaches dry particulaate gypsum addition in paper making with significant amounts of polymeric resin latex binders and retention aids to overcome poor retention and strength reductions.

U.S. Pat. Nos. 3,822,340; 3,961,105 and 4,152,408 disclose other crystalline varieties of calcium sulfate in a whisker fiber form and suggest their use as reinforcing fiber in products such as paper. Such whisker fiber materials are made from select materials under energy intensive autoclaving conditions with extensive dewatering and drying. British Pat. No. 1,526,165 and U.S. Pat. No. 4,270,954 describe the through-solution production of very large and very long calcium sulfate dihydrate fibers having average length to diameter aspect ratios over 100:1 and lengths in the longest dimension of at least 0.2 millimeters for possible use in paper. The fibers are obtained by a through-solution reaction, with complete calcium sulfate dissolution, under quiescent conditions over periods of time up to 16 hours. Such would be prohibitively expensive in an area of use where an increase of a few cents per pound over commonly available spheroidal particles of other minerals generally mitigates against an additive's usage.

U.S. Pat. No. 2,304,361 describes a process for preparing gypsum filled paper said to be in a more economical fashion in the sense that a part of the dilution water for paper making is used in preparing the calcium sulfate dihydrate slurry, and the slurry is fed to paper making without dewatering or drying the gypsum. Although the gypsum crystals may have been considered "of a fiberous character" and "of long, needle-like masses" at the time of that patent, this was in comparison to the then common alternative of finely ground or powdered gypsum. The process disclosed actually produces masses of extremely small needles due to a large amount of self-nucleation of the dihydrate during the crystalization. Such crystals are extremely tiny in comparison to subsequently developed whisker fibers and fiber forms of calcium sulfate dihydrate.

From the above it is apparent that there is a need for gypsum fillers having good retention in paper. Further, there is a need for inexpensively formed paper additives of larger gypsum crystal sizes.

Thus, it is an object and advantage of the present invention to provide gypsum mineral fillers presenting a good particle size and shape for retention that are prepared in a quick and economical fashion for use in paper making.

Another object is to provide an improvement in paper making wherein a gypsum filler presenting a generally different shape and size is added having much greater retention than small needle-shaped masses or spheroidal gypsum particles, and without the expensive production costs of the extremely long and slender whisker and fiber materials.

These and other objects and advantages which will become apparent as the specification proceeds are accomplished by growing large tabular acicular gypsum crystals in about 15 minutes in a seeded continuously stirred reactor under low super-saturation conditions. The seeding keeps super-saturation to a minimum. The obtained slurry of crystals have an aspect ratio of about 100:10:1 and by count average length of about 100–450 micrometers (um) in the largest dimension of the particle and about 10–40 um in the second largest dimension. In paper making processes, the obtained slurry may be added to paper pulp at any point prior to web formation by drainage.

DESCRIPTION OF THE PREFERRED EMBODIMENTS

Figure 1:
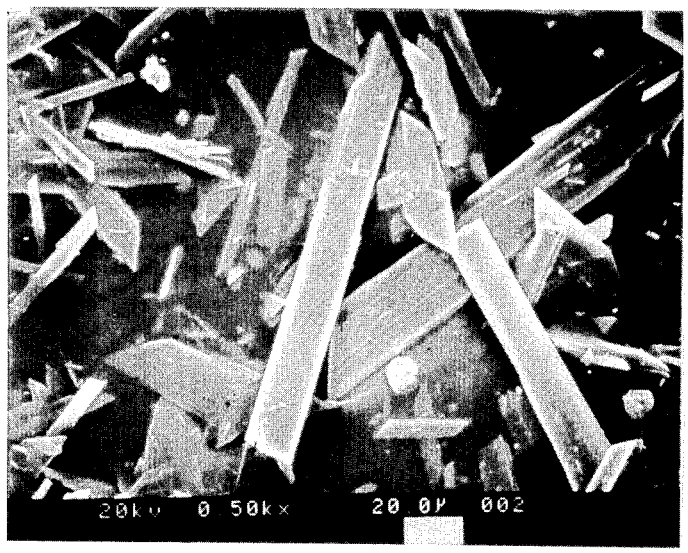
FIG. 1 is a scanning electron microscopic photograph of tabular acicular gypsum crystals of the invention.
Figure 2:
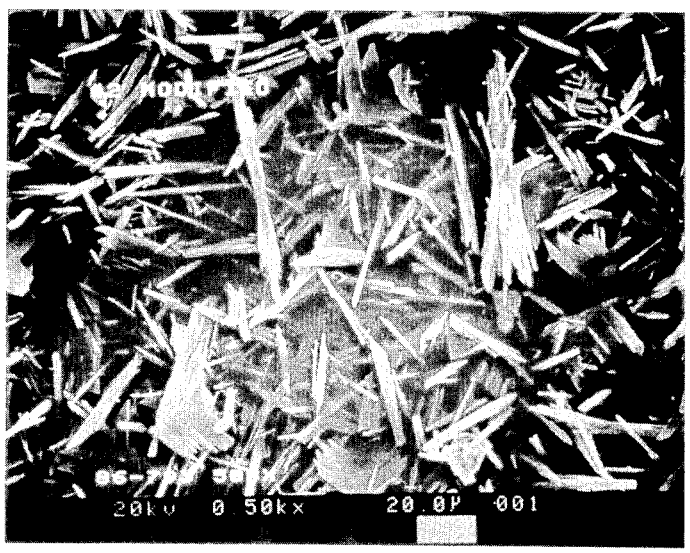
FIG. 2 is a scanning electron microscopic photograph of tiny needles of gypsum.

The mineral filler of the present invention is prepared by hydrating calcium sulfate hemihydrate in a constant volume, seeded, continuously stirred (with gentle sweeping agitation) atmospheric pressure reactor under low levels of super-saturation, preferably using an about 20-25% by weight total solids slurry at about 50°-60° C. to produce a tabular acicular configuration having a mean particle size in the largest dimension of the particles of about 100-450 um and about 10-40 um in the second largest dimension. Preferably the produced particle slurry is classified, with the smaller particles recycled to the reactor while the larger particles are passed to the paper-making pulp.

The calcium sulfate hemihydrate reactant may be any of the commonly available commercial materials. Thus the hemihydrate may be ordinary plaster of Paris or kettle stucco which are forms of beta calcium sulfate hemihydrate, or it may be a form of alpha calcium sulfate hemihydrate also called alpha gypsum. Such hemihydrates may be calcined from natural gypsum or derived from calcium sulfates produced in various chemical processes such as from flue gas desulfurization products, citrogypsum, phosphogypsum and the like. Of course, the reaction conditions in the present process may differ slightly due to peculiarities of the specific particular hemihydrate or gypsum source effecting differing rates of dissolution, reprecipitation or crystal habit.

The calcium sulfate hemihydrate should be at about saturation in the reactor, with about 20-25% total solids preferred. A low level of super-saturation is preferred for optimum crystal growth upon seed crystals without a lot of self-nucleation. The rate of reaction is a function of the rates at which the hemihydrate first dissolves in the water and then precipitates upon existant gypsum crystals. If an undesired high level of super-saturation occurs, this diffusion controlled reaction will proceed at a rapid rate with homogeneous self-nucleation leading to a massive "blooming" of very tiny nucleii and little growth upon individual crystals. That leads to an almost gelling of masses of low micrometer sized tiny needle crystals characteristic of U.S. Pat. No. 2,304,361.

The temperature of reaction preferbly is from about 50° C. to about 60° C. The particular desired temperature may be maintained on each charge to the reactor by any convenient means such as direct or indirect heating means, steam injection, electrical heating elements and the like. Temperatures as low as 35° C. and as high as 90° C. may be used.

This temperature keeps the dihydrate as the stable phase in the reaction and keeps reaction rates reasonable in length at preferred solids levels. The total solids in the reactor may be from about 20% to about 25% by weight at the preferred operational temperatures to maintain a low level of super-saturation. Higher levels will lead to higher contact nucleation which leads to stubbier and blockier crystals.

The agitation should be sufficient to keep the particles in suspension without shearing action that would also lead to particle breakage and higher contact nucleation which leads to blockier crystals.

TABLE 1

| SAMPLE NO. | TEMPERATURE & RESIDENCE TIME | PARTICLE MEAN | ASPECT RATIO |
|---|---|---|---|
| 1. | 50° - 10 MINUTES | 324 UM | 10:1 |
| 2. | 50° - 15 MINUTES | 125 UM | 7:1 |
| 3. | 50° - 20 MINUTES | 109 UM | 10:1 |
| 4. | 55° - 10 MINUTES | 187 UM | 9:1 |
| 5. | 55° - 15 MINUTES | 167 UM | 8:1 |
| 6. | 55° - 20 MINUTES | 221 UM | 9:1 |

TABLE 1-continued

| SAMPLE NO. | TEMPERATURE & RESIDENCE TIME | PARTICLE MEAN | ASPECT RATIO |
|---|---|---|---|
| 7. | 60° - 10 MINUTES | 110 UM | 11:1 |
| 8. | 60° - 15 MINUTES | 153 UM | 12:1 |
| 9. | 60° - 20 MINUTES | 216 UM | 11:1 |

TABLE 2

| SAMPLE | FILLER CONTENT OF FURNISH | POROSITY (SECONDS) |
|---|---|---|
| SAMPLE 1: | | |
| UNCLASSIFIED | 25% | 54 |
| CLASSIFIED | 29% | 58 |
| SAMPLE 2: | | |
| UNCLASSIFIED | 27% | 74 |
| CLASSIFIED | 29% | 44 |

EXAMPLE 1

In a series of evaluations, hot water and stucco were fed to a constant volume, heated crystallizer reactor vessel equipped with a motor and impeller to provide a suspending agitation. The stucco and water were proportioned to provide a 20 percent total solids suspension and the impeller was operated at a rotational speed to keep the particles in suspension without settling. The output was passed through a hydroclone for classification and separtion of product particles and recycle of finer materials for these evaluations. Samples prepared at various temperatures and residence times indicted in Table 1 were evaluated for crystal growth, measuring crystal growth in the largest dimension by microscopic count as the average or mean particle length for the sample. Exemplary results are set forth in Table 1.

Basically, all the samples shown in Table 1 produced crystals of the desired configuration. Microscopic examination of the various samples showed generally rather uniform particles of combined acicular nature with a length to width aspect ratio of around 9:1 but with a generally tabular configuration also, with flat sides and blunt ends and having width to thickness ratio around 10:1. FIG. 1 presents a scanning electron microscopic photograph showing the general configuration of tabular gypsum filler crystals of the invention.

Portions of samples 1 and 8 were selected for further evaluation in paper making, with one aliquot of each sample added directly to a paper pulp and another aliquot classified before addition to the pulp. For the classified portions, the sample was passed through a 50 mesh (300 um openings) sieve and then the portion retained on a 140 mesh (106 um openings) sieve was added to the pulp to give a dry fiber to filler ratio of 70:30 parts by weight. The pulp comprised calcium sulfate saturated water mixed with dry fiber to form a 1.5% solids consistency pulp which was refined to 350 Canadian Standard Freeness. The pulp dry fiber solids were 30% waste newspaper and 70% old corrugated box board. The pulps were felted into single ply handsheets prepared according to TAPPI method T-205 on a standard 6¼ inch (159 mm) diameter sheet machine to produce 1.5 gram handsheets. Physical properties of the prepared handsheets are set forth in Table 2.

Looking at Table 2, it is apparent that the samples with fines removed had better retention, even though in one case the classified particle size was lower in aspect ratio and more blocky in terms of average length in the longest dimension. Generally it had been heretofor believed that only more fiberous characteristics led to greater retention in paper formation.

EXAMPLE 2

In another series of evaluations, generally using the crystallizer and procedures of Example 1, a number of different particle shapes and sizes of calcium sulfate dihydrate particles were prepared as follows:

Sample 10—Small spheroidal particles:

Natural gypsum rock that had been ground to small, generally round particles having a particle size average of 24 um by microscopic viewing was obtained from commercially available sources.

Samples 11 and 12—Small needles:

Freshly calcined hemihydrate was charged in a 10% solids slurry to a batch stirred reactor equipped with a turbine mixer providing high speed, high shear mixing at 3000 rpm. This reactor was maintained at 20°-21° C. Within 10 minutes massive self-nucleation resulted in a blooming of very large numbers of tiny needle crystals having a by count average 11.3 micrometer length and aspect ratio of about 5:1 for Sample 11.

Following the procedures of U.S. Pat. No. 2,304,361, freshly calcined hemihydrate was charged in a 10% solids slurry with 0.5% alum to a batch reactor crystallizer similar to the continuous stirred reactor of Example 1. The reactor was at 20°-21° C.: and in about 5 minutes there was a massive "blooming" of small acicular needle crystals. The crystals has a by count average 29 micrometers length and about 10:1 aspect ratio for Sample 12.

Sample 13—Tabular crystals of about 45 um: .

A 20% solids slurry of alpha hemihydrate (HYDRO-CAL B base hemihydrate sold by the United States Gypsum Company) was fed into a seeded continuously stirred reactor crystallizer vessel of Example 1 maintained at 50° C. Seed material provided a location for crystal growth and minimized the extent of nucleation which in turn results in a larger crystal size and more uniform distribution. Optimum seed crystal size at the beginning of reaction appears to be in the area of 20 micrometers. After reaction for 15 minutes, platelet-like tabular crystals having a by count average particle size in the largest dimension of about 45 micrometers, 4-5 um in the next largest dimension, and thickness of 1-2 um were obtained.

Samples 14 through 16—Tabular of about 100-200 μm:

For Sample 14, a flue gas desulfurization calcium sulfate dihydrate derived from a sulfur dioxide scrubbing operation was calcined to hemihydrate and ground to a 10,400 square centimeters per gram Blaine surface area. A 20% solids slurry of this hemihydrate was fed to the crystallizer of Example 1 maintained at 60° C. After 15 minutes reaction, a tabular gypsum crystal slurry was obtained with a by count average particle size in the largest dimension of 127 micrometers, 10-50 um in the second largest dimension, and thickness of 1-3 um.

Further runs under the same conditions as Sample 14, but with the addition of 0.7% by weight sulfuric acid as crystal modifier resulted in larger size, tabular crystals having a by count average particle size in the largest dimension of 155 micrometers, 15-20 um in the second largest dimension, and thickness of 1-3 um which make up Sample 15.

For Sample 16, further runs were made under the same conditions as Sample 13, but without grinding the hemihydrate after calcination. The hemihydrate feed had a surface area of about 3,000 square centimeters per gram Blaine. The obtained tabular crystals had a by count average particle size in the largest dimension of 171 micrometers, 20-30 um in the second largest dimension, and thickness of 1-3 um.

To produce Sample 17, 1% by weight of sodium chloride crystal growth modifier was added to a 20% solids slurry of beta calcium sulfate hemihydrate. The mixture was fed to the seeded continuously stirred reactor crystallizer of Example 1 maintained at 60° C. After 15 minutes a tabular gypsum slurry of crystals having a by count average particle size in the largest dimension of about 192 micrometers, about 20 um in the second largest dimension, and about 3 um thickness resulted.

Samples 18 and 19—Gypsum Fibers of 350 and 1200 um:

In the general fashion of U.S. Pat. No. 4,270,954, a hot (about 95° C.) 5% calcium sulfate solution with 6% nitric acid added was allowed to cool down to room temperature. At 63° C. the mixture was filtered to give gypsum fibers having a by count average length of about 350 um and aspect ratio of about 200:1 as Sample 18. The filtrate was again filtered at room temperature to give a second set of fibers having an average length of 1200 um and aspect ratio of about 300:1 as Sample 19.

Figure 3:
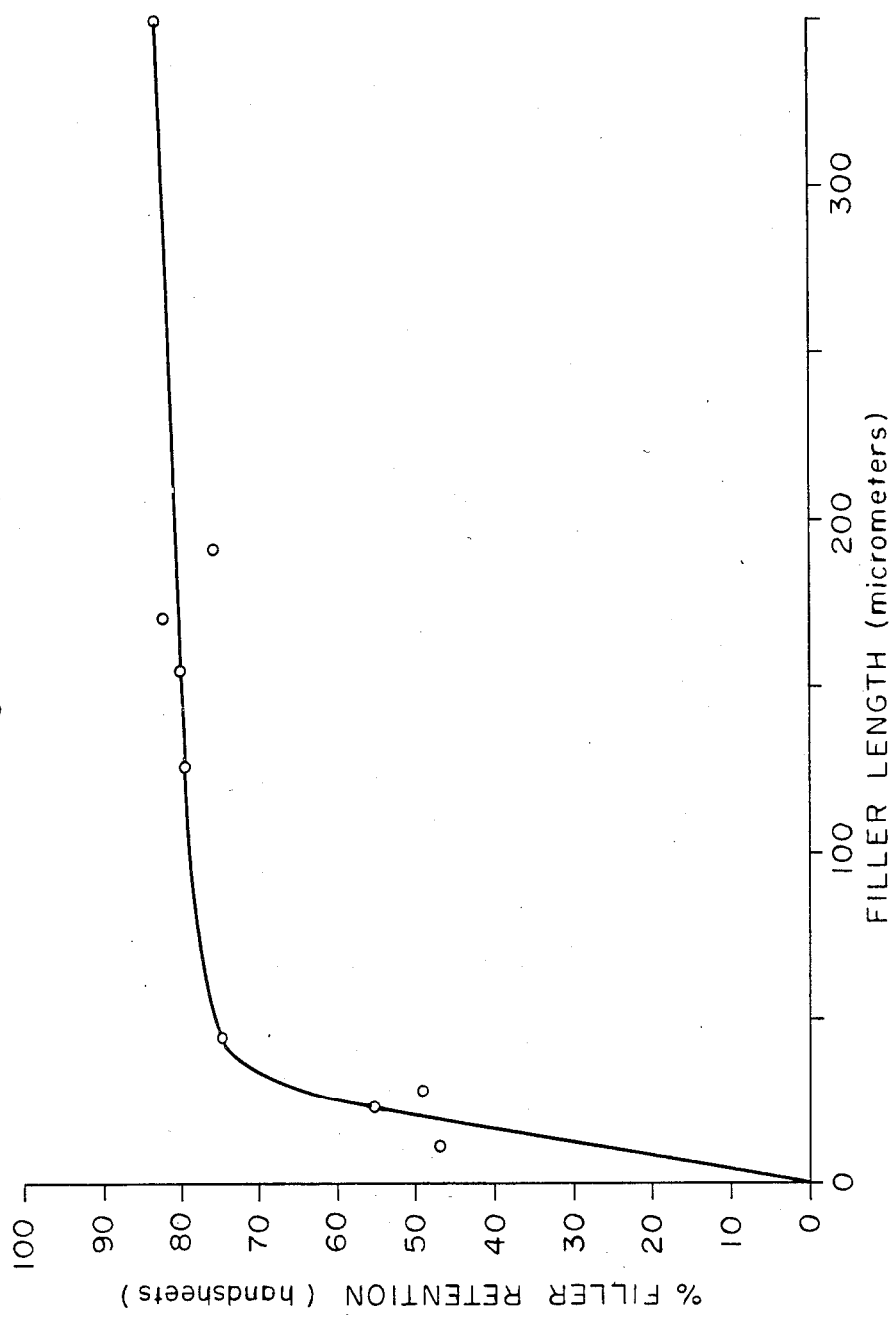
FIG. 3 graphically illustrates percent of dihydrate filler retention versus filler length in micrometers for various gypsum particles.

Various of the obtained samples were added in amounts around 10% or 20% by weight as filler to paper pulp as set forth in Example 1 and hand sheets were formed also using the procedure of Example 1. The hand sheets were evaluated for filler content and % filler retention was calculated. Exemplary results of the % filler retention is diagrammatically set forth in FIG. 3. From FIG. 3 it is clearly apparent that the easily and rapidly formed tabular gypsum crystals having by count average particle sizes in the largest dimension of 45 um and above provided substantially equivalent retention to the 350 um fiber. Although not shown in FIG. 3, Sample 19 exhibited retention that fit on the curve depicted in the figure.

The hand sheets were also evaluated for fiber breaking length by TAPPI standard procedure T 220os-71. Generally the smaller the decrease in paper breaking length in comparison to unfilled control handsheets, the stronger the hand sheet and the more filler may be added while maintaining minimum strength requirements.

Further, the hand sheets were evaluated for percent drop in porosity by TAPPI Useful Test Method 524. It should be remembered in looking at these results that very fine particles may fill in the pores between the matted fibers in contrast to larger filler particles that bridge across the pores or openings between the matted fibers. The impact of this is that some tiny particles may give a false negative drop in porosity value, as in Sample 12.

Various crystal habit modifiers may be added during the preparation of the tabular crystals to emphasize crystal growth in the longest dimension. For example, long needle or fiberous shaped seed crystals, or mineral acids such as sulfuric acid may be added: and various halogen, sulfate or nitrate salts such as sodium chloride may be added to emphasize growth in the proper dimensions.

The tabular crystals of the invention can be advantageously used as additions for the filling and/or improvement of mechanical properties of matrix materials of all kinds. Preferrably they are used for filling various papers such as coarse liner board paper or various grades of fine paper stock. Generally, the tabular crystals of the invention are of a white coloration depending upon the source and impurities in the starting calcium sulfate structure. Various decolorants, brighteners and the like may be added to improve whiteness and brightness if desired depending upon the purposes of the paper pulp. The crystals may also be used for example as filler in the manufacture of plastics of all kinds.

It will be understood that the specification and examples are illustrative but not limitative of the present invention, and that other embodiments within the spirit and scope of the present invention will suggest themselves to those skilled in the art.

What is claimed is:

1. In the manufacture of paper, such as paper for facing gypsum wallboard, the improvement which comprises the steps of:
   A. Forming an about 20%–25% solids aqueous slurry of calcium sulfate hemihydrate;
   B. Hydrating said slurry in a continuously stirred reactor at about 50°–60° C. with suspending agitation to produce large tabular crystals of calcium sulfate dihydrate having a mean particle size in the largest dimension of about 45–350 micrometers and an aspect ratio between the largest dimension and the second largest dimension of at least about 10:1; and
   C. Adding said tabular dihydrate crystals to wet paper pulp at a point before web formation.

2. The process of claim 1 further including the steps of continuously withdrawing and classifying the crystals from the hydrator reactor into a portion of small sized crystals and a portion of larger sized crystals having a mean particle size in the largest dimension of at least about 45 micrometers; returning the small sized crystals to the reactor for further crystal growth; and passing the larger crystals to the paper pulp for paper making.

3. The process of claim 1 in which said tabular dihydrate crystals are added to the paper making refiner dump chest.

4. The process of claim 1 in which said tabular dihydrate crystals are added to the paper making machine chest.

5. The process of claim 1 in which the tabular dihydrate crystals have a mean aspect ratio between the second largest dimension and the third largest dimension of at least about 10:1.

6. The process of claim 1 in which the tabular dihydrate crystals have a mean particle size in the third largest dimension of about 1–3 micrometers.

7. The process of claim 1 in which the tabular dihydrate crystals have a mean particle size of at least about 100 micrometers in the largest dimension, at least about 10 micrometers in the second largest dimension, and at least about 1 micrometer in the third largest dimension.

8. The process of claim 1 in which the aqueous slurry of hemihydrate includes a small amount of crystal habit modifier.

9. The process of claim 1 in which the aqueous slurry of hemihydrate includes a small amount of sulfuric acid crystal habit modifier.

10. The process of claim 1 in which the aqueous slurry of hemihydrate includes a small amount of sodium chloride crystal habit modifier.

11. The process of claim 1 in which the aqueous slurry of hemihydrate includes a small amount of crystal modifier selected from the group consisting of sulfuric acid, sodium chloride, potassium sulfate, magnesium sulfate, mixtures thereof and the like.

* * * * *

UNITED STATES PATENT AND TRADEMARK OFFICE
CERTIFICATE OF CORRECTION

PATENT NO. : 4,801,355

DATED : January 31, 1989

INVENTOR(S) : Norman E. Johnstone, et al.,

It is certified that error appears in the above-identified patent and that said Letters Patent is hereby corrected as shown below:

Column 5, line 29, change "has" to --had--.

Column 6, line 60, change ":" to --;--.

Signed and Sealed this

Fifth Day of June, 1990

Attest:

HARRY F. MANBECK, JR.

Attesting Officer

Commissioner of Patents and Trademarks